(12) United States Patent
Giannetti et al.

(10) Patent No.: US 6,343,160 B1
(45) Date of Patent: Jan. 29, 2002

(54) UTILIZATION OF CACHING IN IMAGE MANIPULATION AND CREATION

(75) Inventors: Bernard John Giannetti, Middle Cove; Scott T. Newham, Marsfield, both of (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/143,431

(22) Filed: Aug. 28, 1998

(30) Foreign Application Priority Data

Aug. 29, 1997 (AU) .............................................. PO8863

(51) Int. Cl.$^7$ ................................................ G06T 1/60
(52) U.S. Cl. ...................... 382/305; 382/276; 382/293; 382/302; 345/536
(58) Field of Search ................................ 345/501, 506, 345/507–509, 513, 523, 521, 531, 530, 536; 382/254, 260, 274, 276, 293, 302, 303, 305, 307; 711/121, 118, 119

(56) References Cited

U.S. PATENT DOCUMENTS

| 4,910,611 A | * | 3/1990 | Cok ............................ 358/453 |
| 5,280,547 A | * | 1/1994 | Mahoney ..................... 382/302 |
| 5,509,115 A | | 4/1996 | Butterfield et al. .......... 395/147 |

FOREIGN PATENT DOCUMENTS

EP          0681279 B1       7/2001       ............ G09G/1/16

\* cited by examiner

*Primary Examiner*—Kee M. Tung
(74) *Attorney, Agent, or Firm*—Fitzpatrick, Cella, Harper & Scinto

(57) ABSTRACT

A method of increasing the speed of image creation on a computer system for the interactive creation of images via a series of creation steps. A resultant image of each of the creation steps is copied to a corresponding separate storage buffer. When making an amendment to the series of creation steps previously performed, one or more of the resultant images is used, so as to reduce the rendering time of producing a final output image.

15 Claims, 7 Drawing Sheets

UTILIZATION OF CACHING IN IMAGE MANIPULATION AND CREATION

FIELD OF THE INVENTION

The present invention relates to the creation of images by means of an interactive computer device.

BACKGROUND ART

The creation of graphical images using a computer as a tool is well known. Adobe's Photoshop (Trade Mark) is an example of image creation software for the creation of complex images on a computer.

A typical computer system 1 for the creation of images is shown in FIG. 1. The system 1 includes a keyboard 2 and a mouse input device 3, in addition to a display device 4 and main computer unit 5. Also present but not shown are a CPU together with memory components including fast (eg. semiconductor) memory and slow (eg. disk) memory. An image creation program 6 runs on the computer 5 and resultant images are displayed on the display device 4.

The image creation program includes a large number of image manipulation functions 7 for applying to an image 8. The computer unit 1 is connected to a printer device 9 for printing the images. The image 8 is created by a user of the system 1 by means of a series of iterative interactions with the computer system 1.

An image can comprise a large number of independent images or objects which are "composited" together. For example, in FIGS. 2 and 3 there are shown example processes utilised in the creation of images. Turning initially to FIG. 2, there is shown a first example process 10 in the creation of a final image 11 to be displayed or printed. The process 10 involves taking a raw initial image 12 and applying a first sharpening filter 13 so as to sharpen the appearance of the picture. The image is then cropped 14 to a particular area of interest, and a sepia process 15 is applied to distort the colour appearance of the image. Next, a contrast enhancement process 16 is applied to produce the final image 11. Each of the processes 13–16 has a number of variables which can independently be set and adjusted by a user of the system of FIG. 1 so as to produce an output image which is subsequently printed.

Turning now to FIG. 3, it is also known to utilise more complex processes in the creation of images, particularly when creating relatively complex images based on multiple independent objects. For example, in FIG. 3, there is shown an image creation process tree 20 for the creation of a final image 21 which involves the combining of various image components A–K. The various image components A–K are combined using operators (Op1–Op8) (eg, operation 22 for image components A & B) which combine the images in a user determined manner to form intermediate images. The intermediate images are then combined with other images higher in the tree to produce a final image 21. Other operators 23 can be provided for non-compositive manipulation or filtering of a lower image. Such a process 20 for the creation of an image is known and effectively represents a more complex implementation of the process of FIG. 2.

Unfortunately, as the potential resolution of output devices has improved, corresponding computation requirements have increased greatly. Further, it is often the case that a user having utilised the system of FIG. 1 to create a complex image wishes to perform a number of minor adjustments to the operations which generated the image. This often requires the frequent recalculation of the final image from its initial raw image, which can result in excessive computational requirements and generally slow iterative updates.

Further, if an operation is inserted between other operations, the entire set of previous operations in the processes must be recalculated and re-rendered. This also occurs when an operation is removed or if the parameters of an operation are modified.

SUMMARY OF THE INVENTION

It is an object of the present invention to provide an method of using resources within a computer system so as to enhance the image creation process.

In accordance with the present invention, there is provided a method of increasing the speed of image creation on a computer system for the interactive creation of images via a series of creation steps, the method including the steps of:

copying a resultant image of each of said creation steps to a corresponding separate storage buffer; and when making an amendment to the series of creation steps, automatically utilising one or more of said resultant images so as to reduce the rendering time of producing a final output image.

BRIEF DESCRIPTION OF THE DRAWINGS

Notwithstanding any other forms which may fall within the scope of the present invention, preferred forms of the invention will now be described, by way of example only, with reference to the accompanying drawings in which.

DETAILED DESCRIPTION

In the preferred embodiment, to reduce the time required for re-rendering a final image after an operation is added, removed or modified, the intermediate image the result of that operation is copied to a temporary buffer which can be stored on disk or in memory of the computer device 2.

Figure 1:
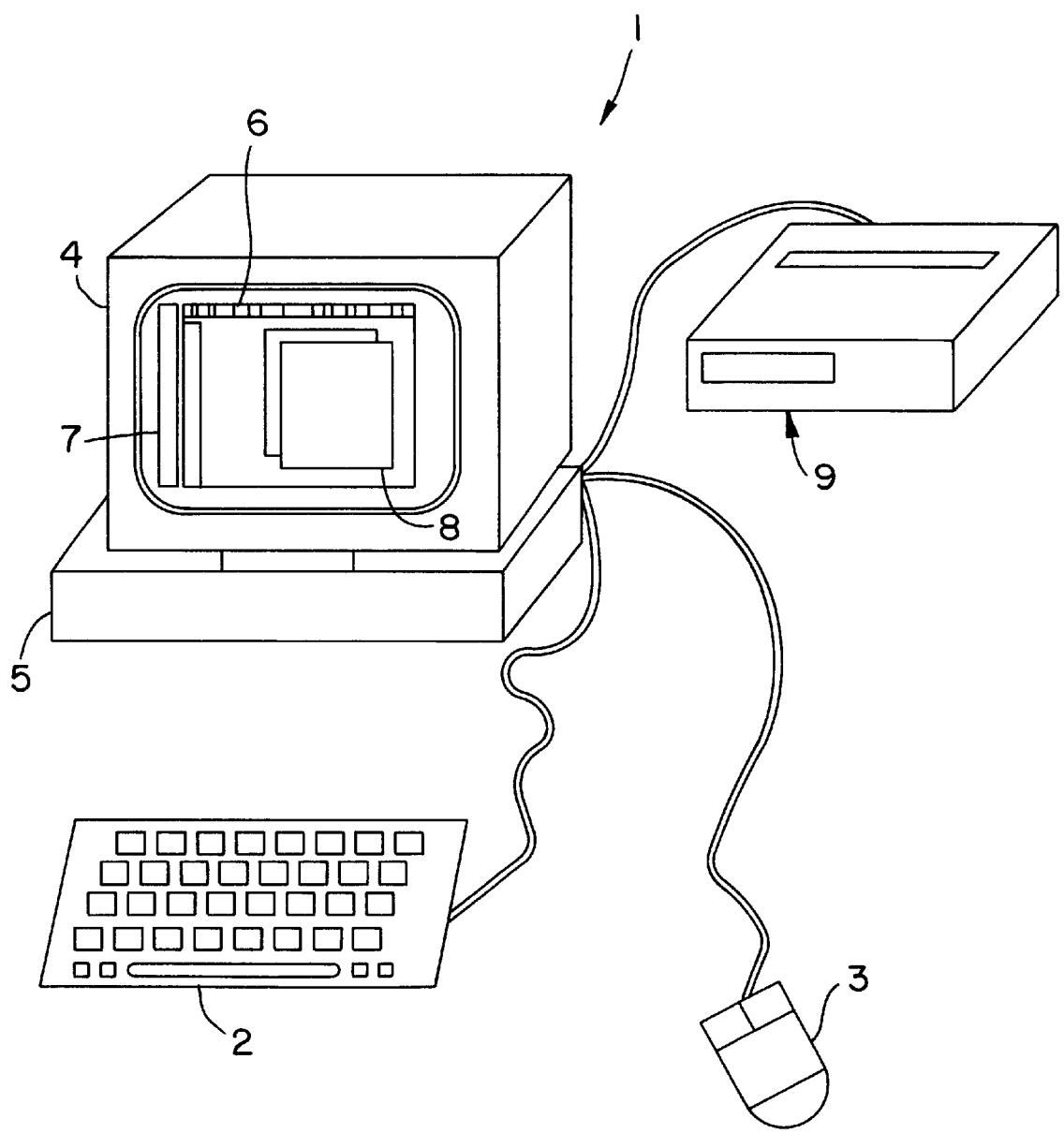
FIG. 1 illustrates a standard computer system arrangement for the creation of complex images.
Figure 2:
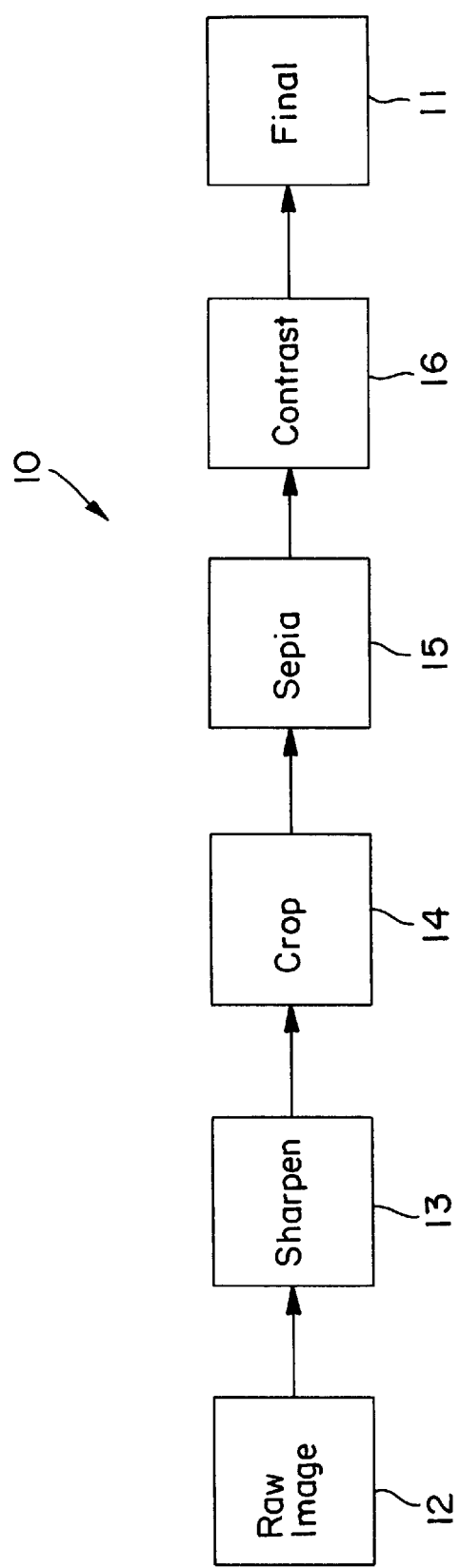
FIG. 2 illustrates the process flow in the creation of a complex image according to a prior art method.
Figure 4:
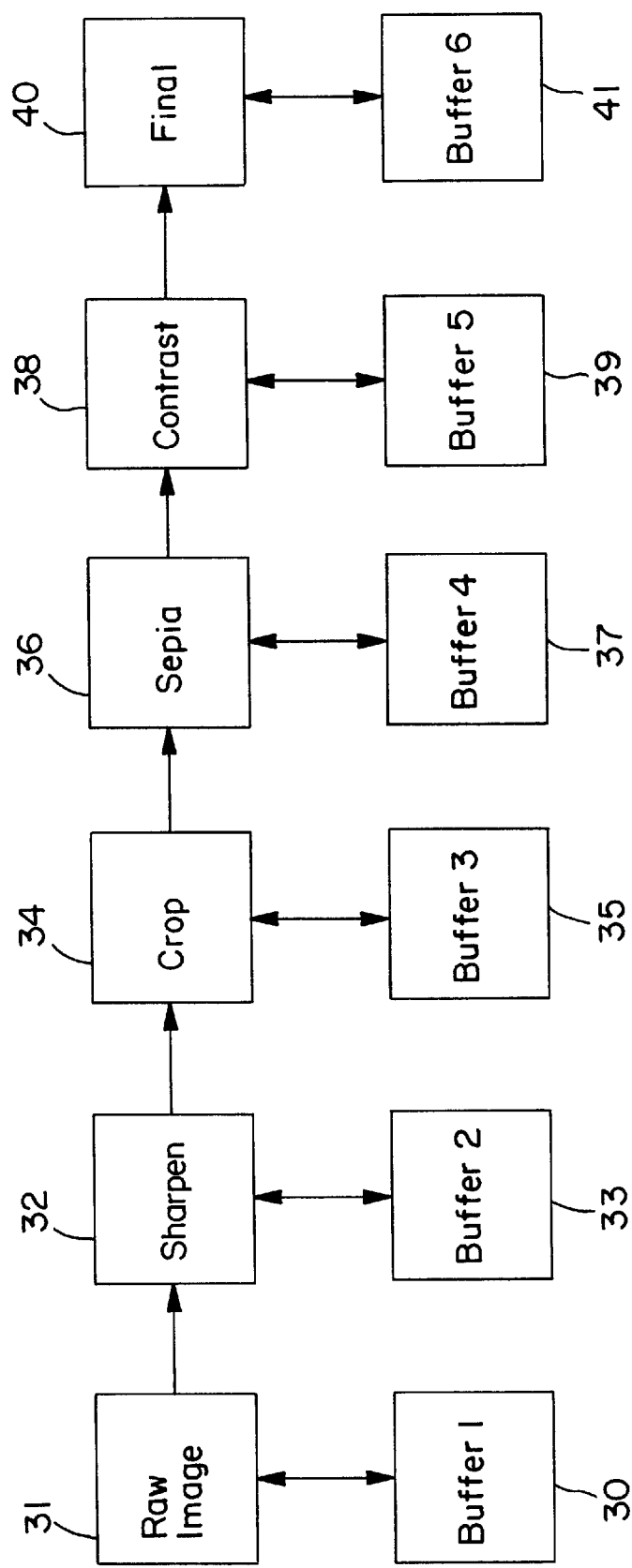
FIG. 4 illustrates the modification of the prior art process flow of FIG. 2 in accordance with the preferred embodiment of the present invention.

Turning to FIG. 4, there is illustrated a simplified overview of the invention, as applied to the process shown in FIG. 2. A raw image 31 is taken from an input buffer 30. A sharpen operation 32 is applied to the raw image 31 and the result copied to a buffer 33. A crop operation 34 is inserted, and the result is copied to its own unique buffer 35. Similarly, the sepia operation 36 copies to a buffer 37, the contrast operation 38 to a buffer 39, with the final image 40 being copied to a buffer 41. In each case, the image being buffered is also rendered to the system's display screen for viewing by the user. Usually, the screen rendering will take place first to ensure that the user can view the results of the operation quickly. However, depending upon the implementation of the invention, it is possible to buffer the image prior to rendering to the screen without departing from the scope of the invention.

The benefits of the above rendering process become apparent when it is required to add or remove operations. For example, if a brightness operation is added between the crop operation 34 and sepia operation 36, the brightness operation can be applied to the image stored in buffer 35 with the consequential requirement that only the downstream operations (36 & 38) need be re-rendered, thereby saving on the rerendering of the upstream operations (32 & 34). Further, if the sepia operation 36 is removed, it is only necessary to re-render the contrast operation 38 taking the input image from buffer 35.

Similarly, if one of the operations, eg. sepia operation 36, has one of its parameters modified, only the downstream operations (36) need to be re-rendered. Hence, through the utilisation of a buffer image associated with each operation, substantial advantages can be produced in the rapid iterative creation of images in that upstream operations need not be re-calculated and rendered.

Figure 3:
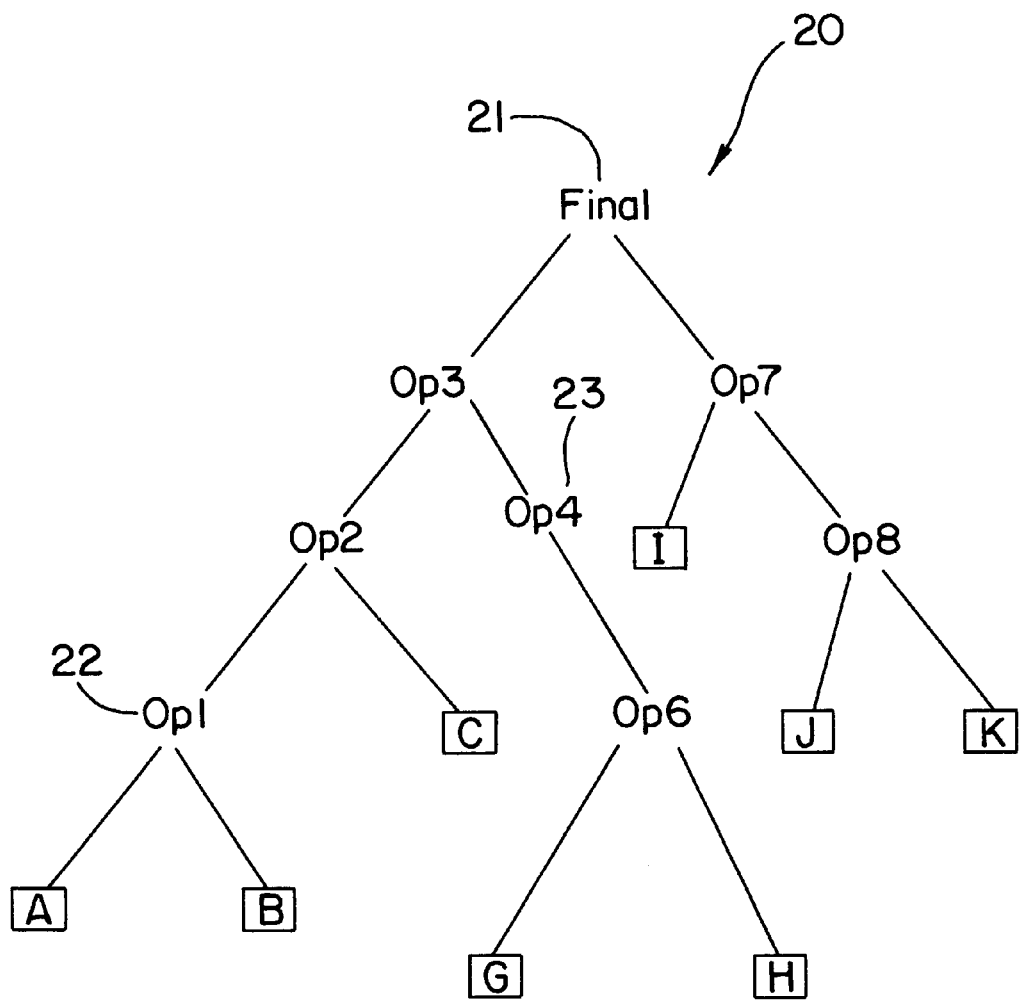
FIG. 3 illustrates an alternative complex image structure.

The principles of FIG. 4 can be applied to the processing tree arrangement of FIG. 3. In this case, a buffer is associated with each node of the tree, and modification of any node of the tree requires the recalculation only of the particular node and its parent nodes rather than recalculation of the whole tree.

Figure 5:
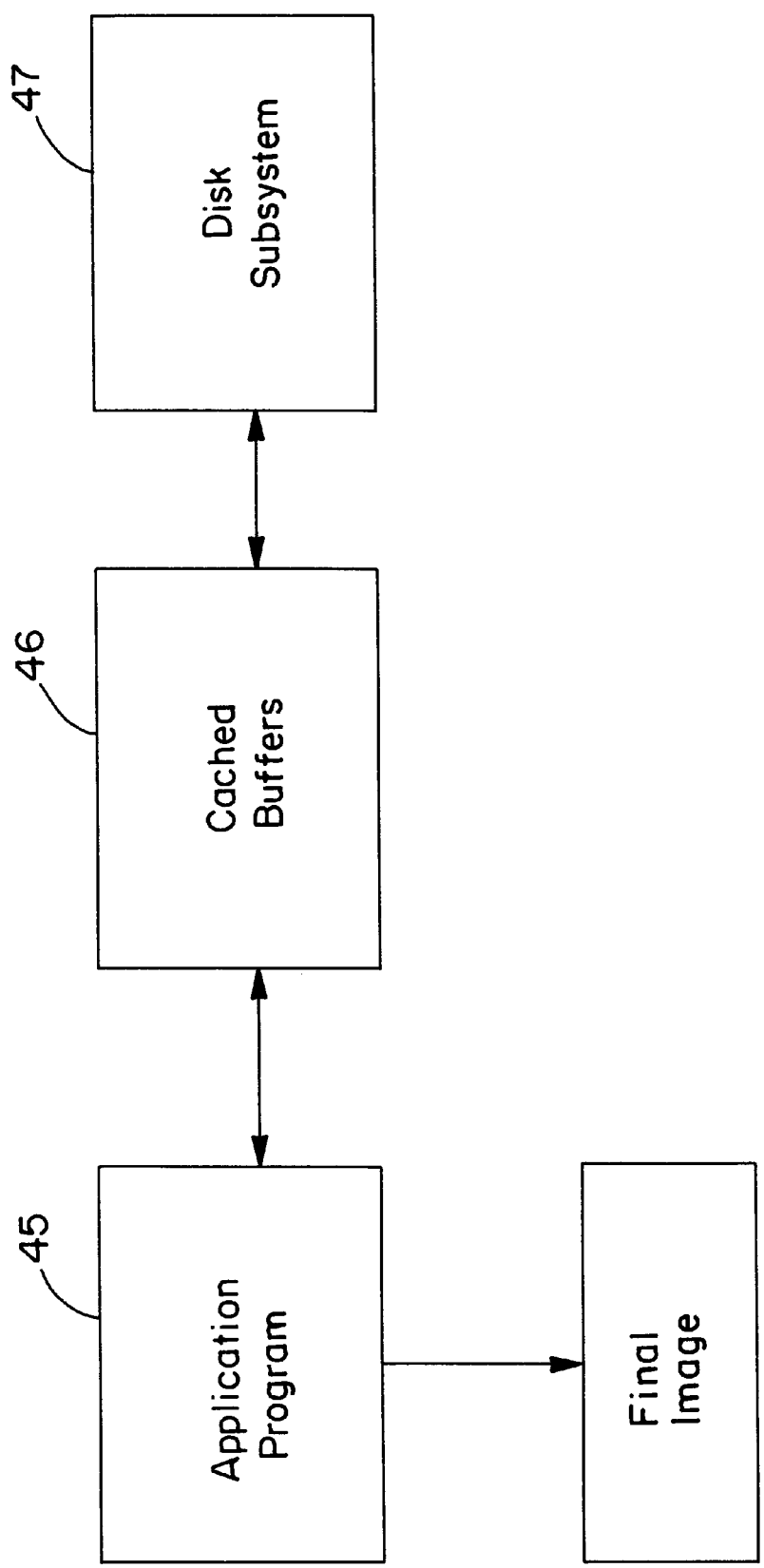
FIG. 5 illustrates a schematic of the system of utilisation of cached buffers as constructed in accordance with the preferred embodiment.

Preferably, the buffers are formed in working (eg. semiconductor) memory so as to allow for their fast access. However, some or all of the buffers can be stored on disk or other relatively "slow" memory when the number or cumulative size of the buffered images becomes too large for storage in relatively small "fast" memory. Where such an arrangement is required, preferably, a system of cached buffers similar to that illustrated in FIG. 5 is utilised wherein an application program 45 for the creation of a complex image interacts with a buffer cache 46, which in turn is responsible for the caching of buffers in real (eg. semiconductor) memory. Buffers which have not recently been accessed can be stored on disk 47. It has been found in practice that a substantial amount of locality exists in the modifications being made by a user creating a complex image, and so the utilisation of a cached buffer system 46 can substantially increase performance where the memory requirements for storing buffers is excessive.

As a further alternative, the caching operation can be implemented for intensive operations only, such as image sharpening and image convolutions. In this case, the elapsed time of an operation can be used to determine whether the resultant image is cached.

Figure 6:
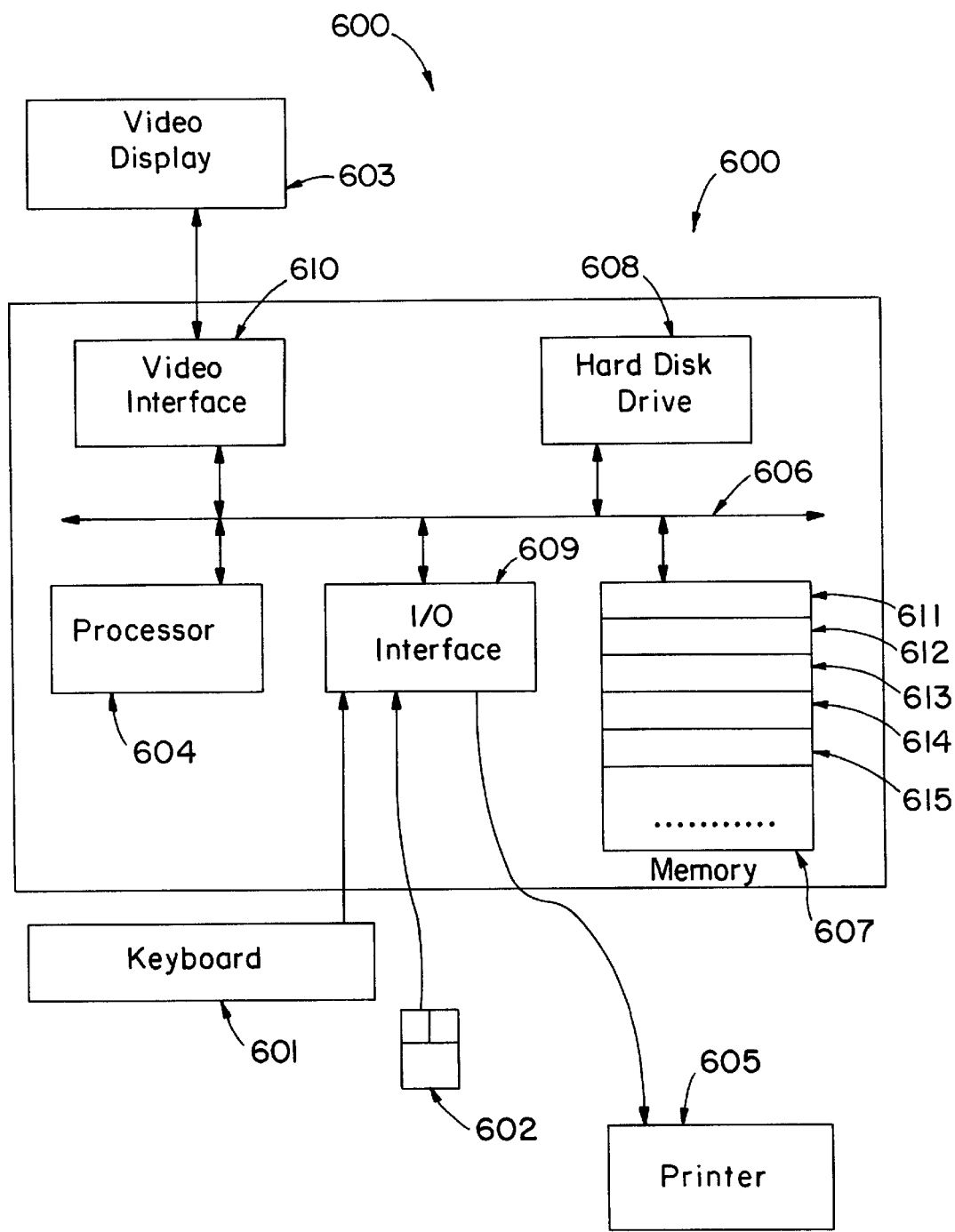
FIG. 6 shows a block diagram of a computer system for use with the invention.

Turning to FIG. 6, there is shown a computer system 600 upon which the preferred embodiment is implemented. The computer system 600 includes a keyboard 601, a mouse 602, a processor 604, a printer 605, and an I/O interface 609 connecting the mouse 602, keyboard 601 and printer 605 with the processor 604 via a system bus 606. The computer system 600 also includes fast memory in the form of semiconductor random access memory (RAM) 607, slow memory in the form of a hard disk drive (HDD) 608 and a video display unit 603 and video interface 610, all connected to the processor (and, where appropriate, each other) via the system bus 606.

According to the preferred embodiment described previously, a raw image 31 is retrieved from a buffer 31 in the form of first memory portion 611. The user inputs commands via the mouse 602 and the keyboard 601, and views the result on video display unit 603. A sharpen operation 32 is performed by the processor 604, and the result displayed at a suitable resolution on video display unit 603 by means of video interface 610. The result is also stored in a buffer 33 in the form of second memory portion 612. Further operations 34, 36 and 38 (described above) are implemented, and after each operation, the result is stored in respective buffers 35, 37 and 39 (described above) in the form of respective memory portions 613, 614 and 615.

If a user wishes to add, say, a brightness operation to the sequence after, say, the crop operation 34, the image in memory portion 613 is retrieved and displayed to enable the additional operation to be implemented. It will be appreciated that the operations 32 and 34 are embodied in the image retrieved from memory portion 613, and so it is not necessary to reapply these operations to the raw image 31. In cases where high resolutions and colour depths are used, this can represent a significant reduction in the time it takes to display the desired intermediate image.

Figure 7:
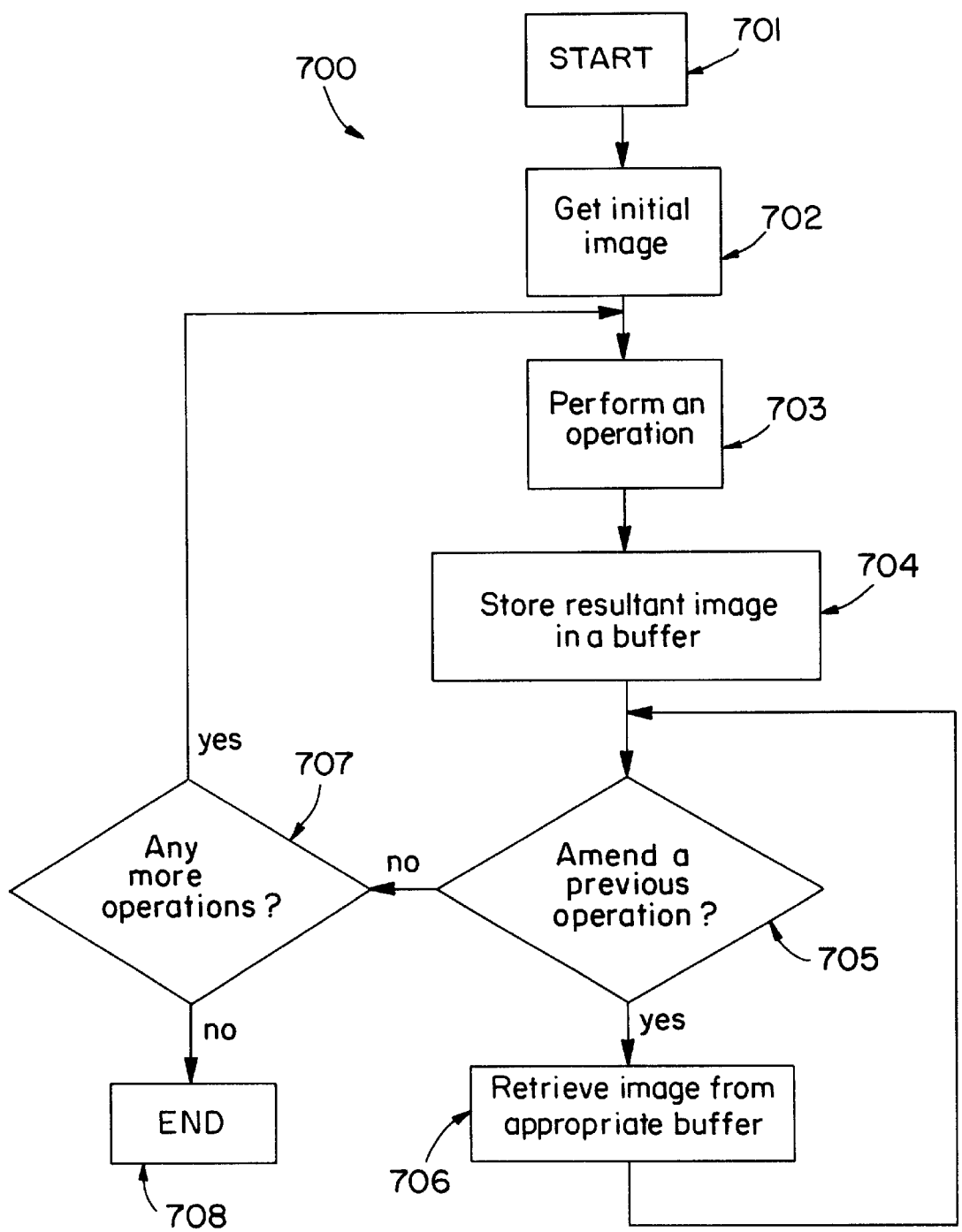
FIG. 7 is a flowchart showing a preferred implementation of the invention.

Turning to FIG. 7, the method described above is shown in a flowchart 700. After starting 701, an initial image (ie, raw image 31) is retrieved from memory (step 702). An initial operation is performed (step 703) on the retrieved image, and the result stored (step 704) in a buffer (as described in relation to FIG. 6). If the user wishes to amend a previous operation (step 705), including, for example, adding an extra operation, then the requisite image is retrieved (step 706) from the appropriate memory location. The method then returns to step 705.

If no amendment is required at step 705, a determination is made (step 707) as to whether any further operations will be performed. If no further operations are required, the method ends 708. The user may then wish to save or print a final copy of the image. Alternatively, if there are further operations to apply, the method returns to step 703. The various steps are then repeated until the user is satisfied with the resultant image.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The claims defining the invention are as follows:

1. A method of increasing speed of image creation on a computer system for interactive creation of an image via a series of creation steps, the method including the steps of:
   storing resultant images of one or more corresponding said creation steps in corresponding separate storage buffers; and
   when making an amendment to a previously performed one said creation steps in said series of creation steps, automatically utilizing one or more of said resultant images of corresponding ones of said creation steps which are prior to said one creation step being amended so as to reduce rendering time of producing a final output image.

2. A method according to claim 1, wherein said separate storage buffers are cached between fast memory and slow memory by said computer system.

3. A method according to claim 1, wherein said series of creation steps comprises a chain of creation steps, said amendment comprises amending one said creation step of said chain of steps and said automatic utilizing step includes the sub-step of using that said resultant image stored in the storage buffer corresponding to a creation step of said chain immediately prior to the creation step being amended.

4. A method according to claim 1, wherein said series of creation steps comprises a tree of creation steps, said amendment comprises amending one said creation step of said tree of steps and said automatic utilizing step includes the sub-step of using those said resultant images stored in the storage buffer corresponding to the creation steps of said tree immediately descendent from the creation step being amended.

5. A method according to claim 1, wherein only those said resultant images which are a result of creation steps which are computationally intensive are stored in said corresponding separate storage buffers.

6. Apparatus for increasing speed of image creation on a computer system for interactive creation of an image via a series of creation steps, said apparatus comprising:
  means for copying a resultant image of one or more corresponding said creation steps in corresponding separate storage buffers; and
  means for automatically utilizing, when making an amendment to a previously performed one of said creation steps in said series of creation steps, one or more of the resultant images of corresponding ones of said creation steps which are prior to said one creation step being amended so as to reduce rendering time of producing a final output image.

7. Apparatus according to claim 6, wherein said separate storage buffers are cached between fast memory and slow memory by the computer system.

8. Apparatus according to claim 6, wherein said series of creation steps comprises a chain of creation steps, said amendment comprises amending one said creation step of said chain of steps and said means for automatic utilizing includes means for using that said resultant image stored in the storage buffer corresponding to a creation step of said chain immediately prior to the creation step being amended.

9. Apparatus according to claim 6, wherein said series of creation steps comprises a tree of creation steps, said amendment comprises amending one said creation step of said tree of steps and said means for automatic utilizing includes means for using those said resultant images stored in the storage buffers corresponding to the creation steps of said tree immediately descendent from the creation step being amended.

10. Apparatus according to claim 6, wherein only those said resultant images which are a result of creation steps which are computationally intensive are stored in said corresponding separate storage buffers.

11. A computer program product having a computer useable medium with a computer program embodied thereon for increasing speed of image creation on a computer system for interactive creation of an image via a series of creations steps, said computer program product including:
  computer program code for storing resultant images of one or more corresponding said creation steps in corresponding separate storage buffers; and
  computer program code for automatically utilizing, when making an amendment to a previously performed one of said creation steps in said series of creation steps, one or more of the resultant images of corresponding ones of said creation steps which are prior to the creation step being amended so as to reduce rendering time of producing a final output image.

12. A computer program product according to claim 11, further comprising computer program code for causing the separate storage buffers to be cached between fast memory and slow memory by the computer system.

13. A computer program product according to claim 12, wherein only those said resultant images which are a result of creation steps which are computationally intensive are stored in said corresponding separate storage buffers.

14. A computer program product according to claim 11, wherein the series of creation steps comprises a chain of creation steps, the amendment comprises amending one said creation step of the chain of steps and said computer code for automatic utilizing includes computer code for using that said resultant image stored in the storage buffer corresponding to a creation step of the chain immediately prior to the creation step being amended.

15. A computer program product according to claim 11, wherein the series of creation steps comprises a tree of creation steps, the amendment comprises amending one said creation step of the tree of steps and said computer program code for automatic utilizing includes computer program code for using those said resultant image stored in the storage buffers corresponding to the creation steps of said tree immediately descendent from the creation step being amended.

* * * * *

UNITED STATES PATENT AND TRADEMARK OFFICE
CERTIFICATE OF CORRECTION

PATENT NO. : 6,343,160 B1  Page 1 of 1
DATED : January 29, 2002
INVENTOR(S) : Bernard John Giannetti et al.

It is certified that error appears in the above-identified patent and that said Letters Patent is hereby corrected as shown below:

Column 2,
Line 11, "an" should read -- a --;
Line 51, "image" should read -- image as --.

Column 4,
Line 33, "708." should read -- (step 708). --;
Line 54, "one" should read -- one of --.

Column 6,
Line 7, "creations" should read -- creation --.
Line 40, "image" should read -- images --

Signed and Sealed this

Fourth Day of February, 2003

JAMES E. ROGAN
*Director of the United States Patent and Trademark Office*